United States Patent [19]
Obney

[11] Patent Number: 5,419,119
[45] Date of Patent: May 30, 1995

[54] HIGH PRESSURE SLAB MOTOR

[75] Inventor: Phyllis E. Obney, Indian Head, Md.

[73] Assignee: The United States of America as represented by the Secretary of the Navy, Washington, D.C.

[21] Appl. No.: 98,913

[22] Filed: Jul. 29, 1993

[51] Int. Cl.$^6$ ............................................. F02K 9/08
[52] U.S. Cl. ........................................................ 60/253
[58] Field of Search ....................... 60/200.1, 223, 253; 73/117.1, 117.4, 167, 116

[56] References Cited
U.S. PATENT DOCUMENTS

| | | | |
|---|---|---|---|
| 2,958,184 | 11/1960 | Sanders | 60/223 |
| 3,946,607 | 3/1976 | Panella | 73/167 |
| 4,554,823 | 11/1985 | Lilley | 73/116 |
| 4,759,215 | 7/1988 | Atchey et al. | 73/167 |

OTHER PUBLICATIONS

Marks, Lionel S., *Mechanical Engineers' Handbook*, Mc Graw–Hill, New York, 1958. Section 11, p. 119.

*Primary Examiner*—Timothy S. Thorpe
*Attorney, Agent, or Firm*—Jacob Shuster

[57] ABSTRACT

A slab motor for testing propellant samples (also referred to as a ballistic evaluation motor) having increased insulation and high pressure capability up to 10,000 psi is provided. The slab motor has a steel tube body with steel end caps, the whole assembly being insulated with liners. A test head device is attached to the forward end of the slab motor providing a mount for measuring thrust, two ports for attachment of pressure transducers, a rupture diaphragm to preclude explosive pressure build-ups, and an open port for attachment to the slab motor. A removable nozzle assembly allows easy replacement of the exhaust nozzle attached to the aft end of the slab motor.

5 Claims, 1 Drawing Sheet

HIGH PRESSURE SLAB MOTOR

ORIGIN OF THE INVENTION

The invention described herein was made in the performance of official duties by an employee of the Department of the Navy and may be manufactured, used, licensed by or for the Government for any governmental purpose without payment of any royalties thereon.

CROSS REFERENCE TO RELATED PATENT APPLICATIONS

The instant application is related to my co-pending patent application Ser. No. 08/086,404, entitled METHOD FOR TESTING AND MINISCALE BALLISTIC TEST MOTOR FOR ROCKET PROPELLANTS filed on Jun. 30, 1993, now abandoned.

FIELD OF THE INVENTION

The invention relates to the field of rocket motor testing and particularly to high pressure ballistic test motors.

BACKGROUND OF THE INVENTION

Solid rocket propellant must be designed, evaluated and produced so as to evolve or generate hot gas in a controllable manner. This controlled evolvement of hot gas can then be utilized to propel a missile, rocket or other projectile in a predictable way.

It is well known to those skilled in the technology that to ensure controlled gas evolution (burning), the following ballistic performance parameters of the propellant must be measured:

(1) burn rate (r) as a function of pressure, generally given by (r) in the equation $r = aP^n$, where P is the pressure;

(2) burn rate exponent, generally given by (n) in the same equation;

(3) burn rate pre-factor, generally given by (a) in the same equation;

(4) burn rate sensitivity to temperature given by $$\frac{1}{r}\left(\frac{\partial r}{\partial T}\right)_p$$

written as $\sigma_p$; and (5) pressure sensitivity with respect to area ratio where the area ratio is defined as K=propellant burning surface area divided by rocket nozzle throat area and the pressure sensitivity is defined as:

$$\pi_k = \frac{1}{P}\left(\frac{\partial P}{\partial r}\right)_K$$

There are two methods used to measure these quantities. The first is called strand burning. Well-known to those skilled in the art is the *Chemical Propulsion Information Agency* (CPIA) handbook which contains standard data for strand burning of various propellants, some of which data is contained in graph form. This method consists of cutting the propellant into spaghetti-size strands and then burning them at various constant temperatures and pressures. The strands must be burned in an expensive device, a Crawford Bomb, which requires much maintenance. Additionally, many strands must be burned (requiring multiple test burns) to collect the data required to evaluate parameters (1) through (4) above. This procedure is very time consuming and expensive. Parameter (5) above cannot be evaluated by the strand burning method.

Further, this strand burning method does not allow testing of the propellant under the actual conditions inside a rocket motor. Although the strands are brought to the required pressure by external means, such as nitrogen pressure, and then ignited and burned, this environment does not simulate the turbulent conditions the propellant actually sees inside a rocket motor.

The second method uses a Ballistic Evaluation Motor (BEM). This motor has two advantages over strand burning. First, the BEM allows evaluation of all five parameters, not just (1) through (4). Secondly, the propellant can be evaluated in an environment that simulates conditions inside a rocket motor. This simulation is not possible with strand burning.

Although, there are several types of BEM's used by those familiar with propellant evolution technology, none of the currently available types allow testing at pressure ranges between 5,000 and 10,000 psi. Additionally, new propellants containing aluminum and other corrosive agents, especially when combined with more energetic fuels, have rendered current BEMs unsuitable.

In fact, slab motor designs that provided burning rate characteristics in years past, i.e. the Production Slab Motor and the Advanced Slab Motor, are not adaptable to the newer propellants now under development, especially those containing aluminum and other corrosive agents. The Production Motor was constructed of 1010/1020 steel and used zinc chromate putty to seal mating surfaces. The Advanced Motor is identical except for an asbestos insert and forward and aft insulators. The zinc chromate putty cannot withstand the higher temperatures and pressures encountered with new propellants. As a result, gas flow escaping around the motor tube and around the nozzle shell typically erodes the steel hardware and, in some tests, burns completely through the asbestos inserts. In such a situation, the test data is invalid, and, in addition, the damage causes a drastic depletion of the hardware inventory.

There is an ongoing need to determine burning rate characteristics of energetic and corrosive propellant mixes during research and development. Further, testing is required to determine the effects of these propellants on the numerous rocket motors already in the fleet. The test vehicle must also allow determination of specification compliance of numerous grains to establish and control lot acceptance criteria.

SUMMARY OF THE INVENTION

It is an object of the present invention to provide a Ballistic Evaluation Motor having the capability to obtain burning rate characteristics from one motor firing of various mixes and/or grains at pressure ranges up to 10,000 psi using a standard size propellant test sample.

It is another object of the invention to provide the capability to test advanced energetic propellants.

It is yet another object of the invention to provide a Ballistic Evaluation Motor having the capability of testing corrosive propellants.

It is still another object of the invention to provide a re-useable Ballistic Evaluation Motor.

A further object of the invention is to provide a Ballistic Evaluation Motor having high pressure seals.

Accordingly, the invention is a high pressure, reusable, Ballistic Evaluation Motor having a removable and replaceable inert heat liner and removable and replaceable forward and aft insulators. The liner and insulators, in addition to providing a heat and abrasion shield, provide an initial seal isolating the metal structure of the Ballistic Evaluation Motor from the hot gas flow. An additional seal is provided by O-ring seals located at relatively cool locations on the motor body. A final seal is provided by threaded forward and aft end caps attaching to the motor body, the combination seal effect providing a gas-tight motor to pressures exceeding 10,000 psi. A test head motor mounting device is attached to the motor forward end cap to allow mounting for thrust measurement and couples for two pressure transducers. The test head further provides a heat sink, thereby reducing the thermal load on the forward O-ring seal.

BRIEF DESCRIPTION OF THE DRAWINGS

The foregoing objects and other advantages of the present invention will be more fully understood from the following detailed description and reference to the appended drawings wherein.

DETAILED DESCRIPTION OF THE INVENTION

Figure 1:
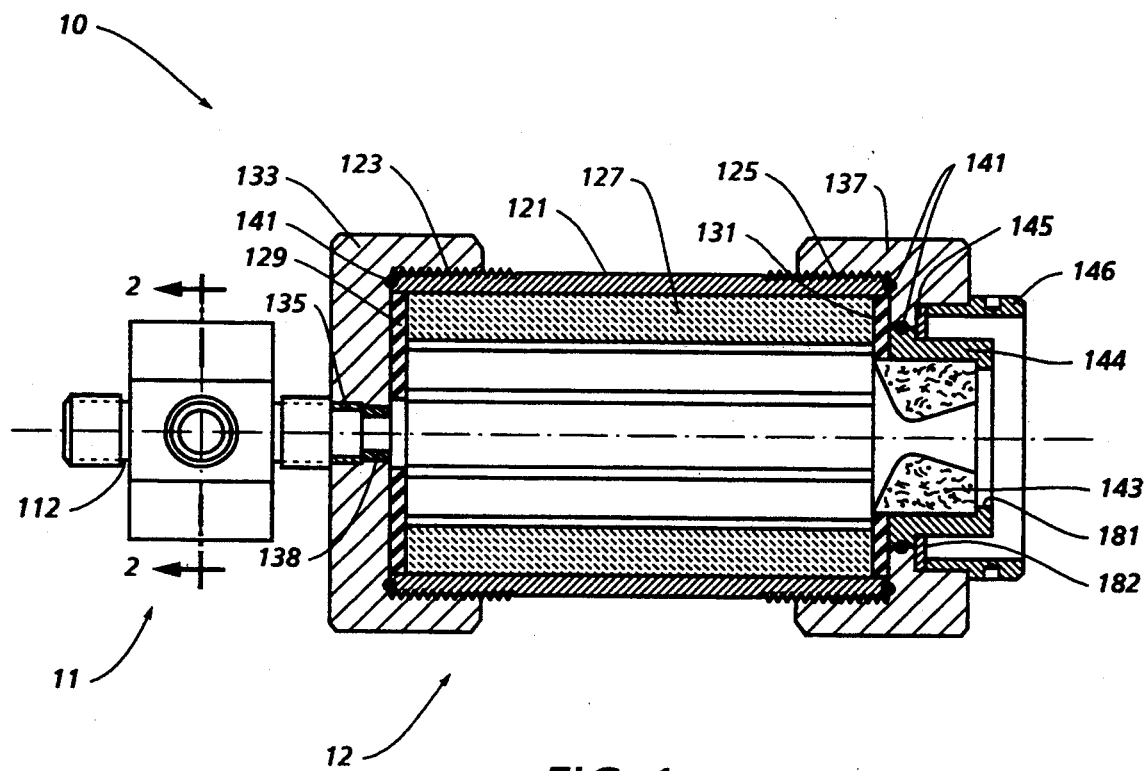
FIG. 1 is a side view of the high pressure slab motor showing the test head in side view and the motor in cross section.

Referring now to FIG. 1, the high pressure slab motor, designated generally by the reference numeral 10, having a multi-part assemblable body unit with an interior chamber is shown with its major components. The slab motor 10 comprises a test head device 11 and the motor assembly 12.

Motor assembly 12 further comprises a body unit having a cylindrical metal body 121 with a threaded forward end 123 and threaded aft end 125. The motor 10 is assembled by sliding an inert liner 127 inside cylindrical metal body 121. In the preferred embodiment, cylindrical metal body 121 is constructed of steel and the inert liner constructed of heat-resistant phenolic fiberglass. The inert liner 127 is shorter in length than the cylindrical metal body 121, thereby forming recesses on each end, where, on the forward end, insulator 129 is seated, and on the aft end, insulator 131 is seated. Inert liner 127 is cylindrical in shape. Forward end insulator 129 is disk-shaped having an opening in the center to provide pressure access from instrumentation. Aft end insulator 131 is also disk-shaped having a larger opening in its center to accommodate insertion of an exhaust nozzle. Forward end cap 133 is screwed onto forward threaded end 123 of cylindrical metal body 121. Forward end cap 133 has a threaded center port 135 which aligns with the center opening in insulator 129 and permits attachment of test head device 11. An insulator collar 138 insulates forward end cap 133 from hot gases flowing into test head device 11.

Aft end cap 137 screws onto the aft threaded end 125 retaining aft insulator 139 in a similar manner. Both end caps are, in addition to the seal provided by the threaded sections, sealed by O-rings 141 on each of the threaded ends. Aft end cap 137 has a center port having a threaded portion in its center to provide a means for securing a nozzle assembly and further having a smooth center portion for slidably accepting the nozzle 143.

The nozzle assembly comprises an exhaust nozzle 143, a nozzle shell 144, a retainer ring 145, and a nozzle retainer 146. Nozzle 143 is held in position by the inside shoulder 181 on the aft end of nozzle shell 144. Nozzle shell 144 has an outside shoulder 182 on the forward end which also has an O-ring 141. This outside shoulder 182 is secured by retainer ring 145 which is in turn secured by nozzle retainer 146. Nozzle retainer 146 is threaded into aft end cap 137. The other components of the nozzle assembly slide into place, the entire assembly being secured by the threaded nozzle retainer 146.

In the preferred embodiment, the exhaust nozzle 143 is constructed of an ablative carbon composite. Thrust measurement is accomplished by attaching the thrust lug 112 to a conventional thrust measuring scale of any of the types routinely available in the art. Sizing of the nozzle throat is accomplished to achieve the desired test pressure level inside the motor, but sizing of the nozzle outlet (exhaust outlet) is not required. An arbitrary divergent section is used in the preferred embodiment. Although optimal sizing of the divergent section is required to achieve maximum thrust, it is not necessary to actually achieve maximum thrust. By using the actual size of the divergent section (although not optimized), a calculation can be made to determine what the maximum thrust would have been, had the nozzle divergent section been optimized.

Internal ballistics (and sizing of the exhaust nozzle) are calculated on the assumptions that: a) Nozzle flow is one dimensional and isentropic; b) Propellant regresses equally, normally on all slab faces; c) Nozzle throat area remains constant or changes linearly with time; and d) The perfect gas law applies to combustion products.

The mass flow through the nozzle is determined by:

$$m_n = \frac{PA_t}{C^*}$$

where $m_n$ is the nozzle mass flow, P is chamber pressure and $A_t$ is the nozzle throat area. $C^*$ is the characteristic velocity. Coupled with the known geometry of the sample, this equation is integrated to give the burn rate as a function of pressure, as follows:

$$\Delta m_T = \frac{1}{C^*} \int_{t_A}^{t_D} PA_t \, dt$$

Figure 2:
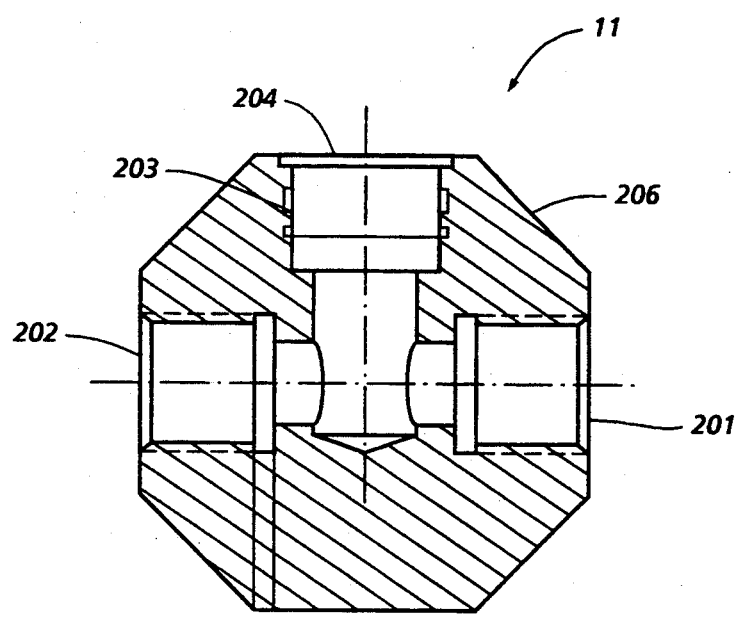
FIG. 2 is a cross-section of the test head as indicated from section line 2—2 of FIG. 1.

This equation is integrated to where $t_A$ and $t_D$ are as shown in FIG. 2 where $\Delta m_T$ is the total mass flow through the nozzle. $C^*$ is assumed constant over the entire pressure range. Mass flow from $t_A$ to any time t is determined by:

$$\Delta m_T = \frac{1}{C^*} \int_{t_A}^{t} PA_t \, dt$$

The portion of mass at any time t is determined by dividing the total mass flow to time t by total mass flow $$\frac{\Delta m_t}{\Delta m_T} = \frac{\int_{t_A}^{t} PA_t \, dt}{\int_{t_A}^{t_D} PA_t \, dt}$$

$\Delta m_t$ = mass propellant burned from time $t_A$ to time t and $\Delta m_T$ = original mass of propellant $M_0$ (neglecting any residue). Using $m_p = \rho_p V_p$ where $\rho_p V_c$ are propellant density and volume, then
where $V_0$ is the original propellant volume.
Since $V_0$, P, t and $A_t$ are measured quantities and the geometry $$\frac{\Delta V_t}{V_0} = \frac{\int_{t_A}^{t} PA_t \, dt}{\int_{t_A}^{t_f} PA_t \, dt}$$

of the sample is known, the distance $\delta x$ that the burning surface regresses in time $\delta t$ can be calculated as $$r_{avg} = \frac{\delta x}{\delta t}$$

$r_{avg}$ is the average burn rate over interval $\delta t$ corresponding average pressure for the time interval is given by $$P_{avg} = \frac{\int_{\delta t} P \, dt}{\delta t}$$

Using the preceding methods, the technician determines nozzle throat size accurately, but need not calculate, nor shape, the nozzle divergent section for best performance. An accurate throat is prepared with an arbitrary divergent section and the diameter of the exit is reported with the test data. The actual, non-optimized, divergent section exit diameter is used to calculate corrected thrust values. This procedure greatly simplifies calculation of nozzle shape and construction of the actual nozzle.

During operation of the slab motor 10, temperatures in the combustion chamber typically reach 4000°-6000° F. Additionally, high velocities of the gas flow provide an erosive cutting flow far exceeding that found in a welding/cutting torch. To combat the erosive effects, the entire inner surface of the motor is insulated with the exception of the forward port to the test head device 11. Exhaust nozzle 143 is heat non-conductive and provides heat dissipation through its ablative properties. The inner rear shoulder 181 of the nozzle shell 144 are shortened compared to the nozzle exit diameter thereby avoiding direct contact with the hot exhaust flow even during severe underexpansion of the exhaust flow. Further insulation is provided by aft end insulator 131, by inert liner 127, and by forward end insulator 129. The redundant sealing provided by the mating of the insulating components, when combined with the three fluorocarbon elastomer O-rings, precludes the development of any flow velocity behind the insulators. As a result, the only thermal transport mechanism is by conduction. The best conductive heat path occurs at the forward end cap through the instrumentation port and then by conduction to the forward O-ring 141. As the O-rings are easily meltable, being essentially rubber, they must be maintained at a very low temperature, less than 200° F. The heat reduction in the forward end cap 133 is aided by the attachment of test head device 11. Test head device 11 acts as a heat sink, reducing heat flow to the outer extremities of the forward end cap 133. This heat sink, combined with the very brief period of operation of the motor, provides sufficient heat protection to allow repeated test firings using the same O-ring seals. The overall result is that the O-rings can be re-used through six to eight test runs before replacement is necessary. The useful life of the liner and insulators is also six to eight test runs, so a re-build of the replaceable components of the motor is accomplished for all components at the same time intervals. There is no need to disassemble the motor between tests to replace individually failing components.

Referring now to FIG. 2, the test head device is shown in cross-section, showing the internal features. The flow pressure enters the test head device from the rearward direction (directly into the paper) and is then diverted in the channels to multiple ports as shown in the cross-section. Ports 201 and 202 are threaded openings for attachment of transducers for reading combustion pressure. Port 203 is a safety port having a rupture diaphragm 204 sealing the port. The rupture diaphragm is sized to rupture when the design pressure is exceeded. In the preferred embodiment, the rupture diaphragm is sufficient to contain 10,000 psi and thereafter to rupture releasing pressure in the motor. The feature is necessary because some test pressures require very small nozzle throats. Occasionally, a small throat may plug up, in which event, the rupture diaphragm fails, avoiding an explosion of the entire motor. Construction of the test head in the preferred embodiment is of a hardened tool steel and, as noted, the mass of the test head 206 provides a heat sink for reducing the thermal load on the forward motor components.

The features and advantages of the invention are numerous. The new motor has the new capability of measuring thrust using the test head device which also serves a heat sink and attachment points for dual pressure transducers. The maximum allowable test pressure has been raised from the previously available maximum of 5000 psi to 10,000 psi with an added feature of the rupture diaphragm in the event of nozzle obstruction. The O-ring seals have been added and protected from heat deterioration by increased insulation and by the heat sink.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. A high pressure slab motor comprising:
   a cylindrical metal body having a threaded forward end and a threaded aft end;
   an inert liner having an aft end and a forward end and fitting concentrically inside said cylindrical metal body;

a forward end insulator fitting inside said cylindrical metal body and capping the forward end of said inert liner;

an aft end insulator fitting inside said cylindrical metal body and capping the aft end of said inert liner;

a forward end cap having a threaded center port and being screwed onto said cylindrical metal body;

an O-ring located on the forward end of said cylindrical metal body providing a seal with said forward end cap;

an aft end cap having a threaded port for attachment of a nozzle retainer and being screwed on said cylindrical metal body;

an O-ring located on the aft end of said cylindrical metal body providing a seal with said aft end cap;

an exhaust nozzle slideably engaging said aft insulator;

a nozzle shell having an outside forward shoulder and an inside aft shoulder and slideably engaging said nozzle and abutting said aft insulator;

a retainer ring engaging the outside forward shoulder of said nozzle shell;

a nozzle retainer abutting said retainer ring and threadably engaging said aft end cap;

an O-ring located circumferentially around the outside forward shoulder of said nozzle shell and providing a seal with said aft end cap; and a test head device fabricated of heat conductive material to form a heat sink threadably attached to said forward end cap through the threaded center port and having a plurality of ports for pressure measurement and pressure relief.

2. A high pressure slab motor as in claim 1 wherein said cylindrical metal body is constructed of tool-hardened steel.

3. A high pressure slab motor as in claim 1 wherein said inert liner is fabricated using phenolic fiberglass.

4. A high pressure slab motor as in claim 1 wherein said exhaust nozzle is an ablative carbon composite.

5. A high pressure slab motor as in claim 1 wherein said test head device has dual pressure ports suitable for attaching pressure transducers.

* * * * *